Sept. 1, 1953 G. P. ADAMS 2,650,791
MATERIAL WEIGHING APPARATUS
Filed April 28, 1951
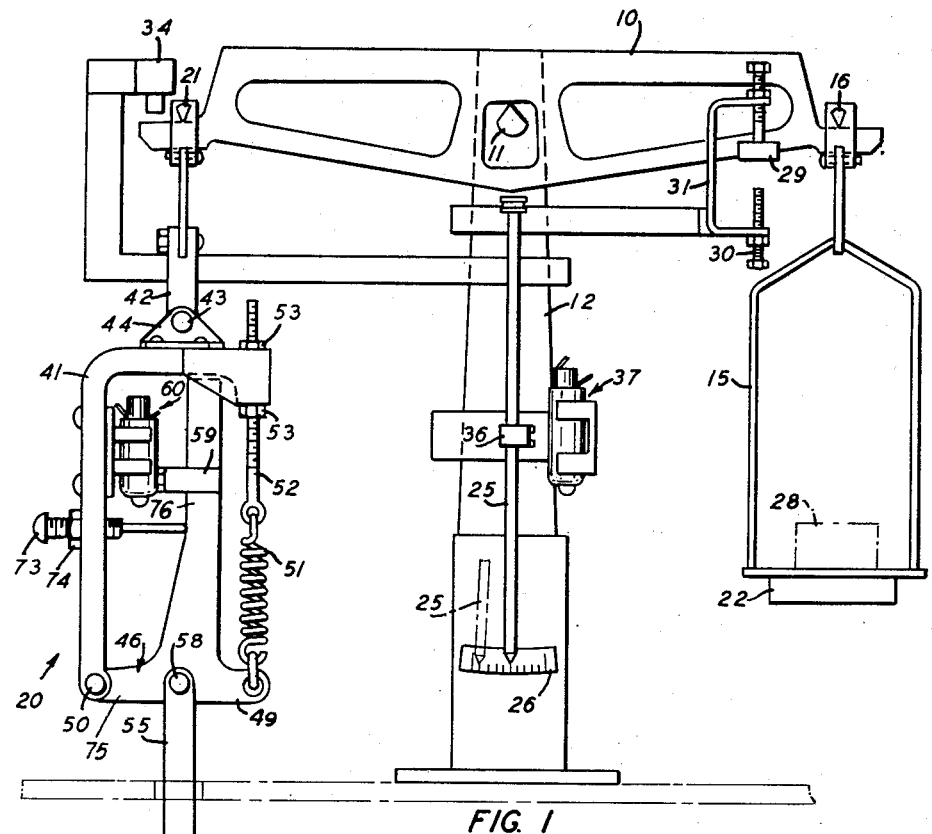
FIG. 1
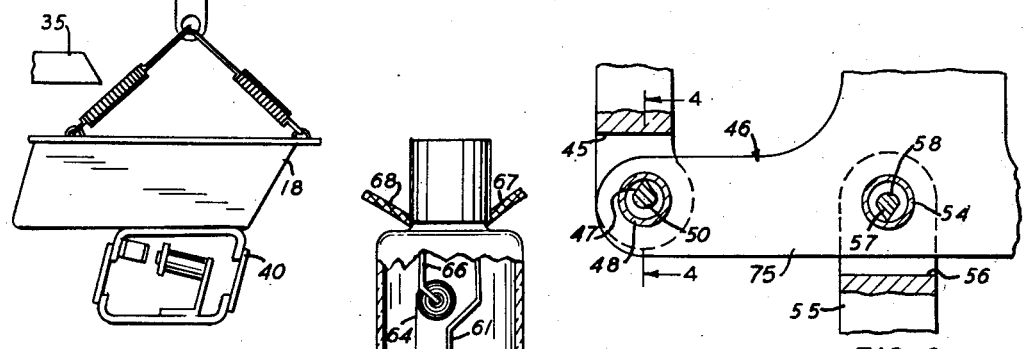
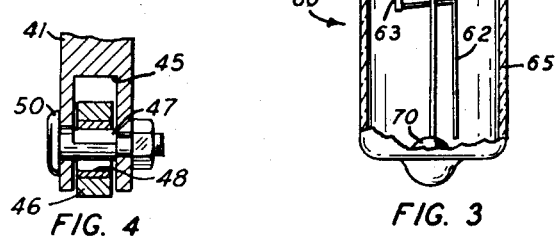
FIG. 4     FIG. 3     FIG. 2
INVENTOR
G. P. ADAMS
BY
ATTORNEY Patented Sept. 1, 1953

2,650,791

UNITED STATES PATENT OFFICE 2,650,791

MATERIAL WEIGHING APPARATUS

George P. Adams, Baltimore, Md., assignor to Western Electric Company, Incorporated, New York, N. Y., a corporation of New York Application April 28, 1951, Serial No. 223,511

9 Claims. (Cl. 249—16)

This invention relates to material weighing apparatus, and more particularly to weight actuated controllers for material weighing apparatus.

In formulating some types of thermoplastic, electrical insulating compounds, such as polyvinyl chloride compounds, the individual ingredients thereof are fed from supply hoppers into weigh pans attached to weighing scales arranged to shut off the flow of material from the supply hoppers automatically when their respective weigh pans contain a predetermined amount of material. When each weigh pan contains the required amount of an ingredient, all of the weigh pans are arranged to discharge their contents simultaneously into mixing apparatus, storage tanks or other apparatus. It is important that the individual weigh pans discharge all the weighed ingredients in order for each weighing operation to provide a uniform batch of compound.

Weight actuated devices usually are provided for rendering the weighing apparatus inoperative if any one of the weigh pans fails to discharge all of its contents. In instances where the amount of a particular ingredient to be weighed is very small as compared with the total amount of material being weighed into the batch, the weight actuated device must be capable of responding to the weight of a minute quantity of an ingredient that remains in its respective weigh pan in order to prevent improper mixture of the compound.

An object of the invention is to provide new and improved material weighing apparatus.

Another object of the invention is to provide new and improved weight actuated controllers for material weighing apparatus.

Material weighing apparatus embodying certain features of the invention may include a balance beam, a counterpoise suspended from the one end of the beam, a sensitive electric switch suspended from the opposite end of the beam, means suspended from the same end of the beam for actuating the electric switch, load receiving means suspended from the switch actuating means so that the weight thereof tends to move the switch actuating means to open the switch, and yieldable means acting against the weight of the load receiving means for holding the switch actuating means in a position in which it closes the electric switch, said yieldable means being such that a predetermined minute increase in weight on the load receiving means overcomes the yieldable means and causes the actuating means to open the switch.

Other objects and advantages of the invention will appear from the following detailed description of a specific embodiment thereof, when read in conjunction with the appended drawings, in which:

Fig. 1 is a front elevation of a material weighing apparatus embodying certain features of the invention;

Fig. 2 is an enlarged view of a portion of the apparatus shown in Fig. 1, with parts thereof broken away, and Fig. 3 is an enlarged view of an electric switch provided on the apparatus shown in Fig. 1, with portions broken away, and Fig. 4 is a vertical section taken along line 4—4 of Fig. 2.

Referring now to the drawings and more particularly to Fig. 1, there is shown a balance scale type of material weighing apparatus which includes a balance beam 10 mounted pivotally on a knife edge 11 secured to a vertical post 12. A counterpoise tray 15 is suspended from the right hand end of the balance beam 10 on a knife edge 16 and a weigh pan 18 is suspended from a weight actuated controller indicated generally at 20, which in turn is suspended from the left hand end of the balance beam 10 on a knife edge 21. The combined weight of the controller 20 and the weigh pan 18 is greater than that of the counterpoise tray 15, and this difference in weight is offset by placing metal pellets, such as lead shot, in a container 22 secured beneath the counterpoise tray 15 until the beam 10 is balanced on the knife edge 11, that is, until the beam 10 assumes a horizontal position. A pointer 25 attached to the beam 10 coacts with a scale 26 secured to the post to indicate when the beam 10 is balanced.

The principal elements of the balance scale shown in Fig. 1, with the exception of the controller 20, are similar to conventional balances used for weighing small amounts of material. In using such a balance to weigh material, a counterpoise 28 corresponding to the amount of material to be weighed in the weigh pan 18 is placed on the counterpoise tray 15. The counterpoise 28 overbalances the beam 10 in a clockwise direction, and causes the pointer 25 to move to the left of the scale 26 and assume its broken line position, as shown in Fig. 1. The beam 10 pivots about the knife edge 11 until a lug 29 on the beam engages a screw 30 provided in a support 31. When the beam is overbalanced by the counterpoise 28, the left end of the beam engages a sensitive magnetically operable switch 34 supported on the post 12 in the manner shown.

It may be assumed that the beam closes the switch 34 to render a vibratory feeder, a portion of which is indicated at 35, operative to advance a powdery material from a supply hopper (not shown) into the pan 18. The beam 10 of the balance scale remains in an overbalanced condition while the feeder 35 feeds the material into the weigh pan 18. When the weight of the material in the weigh pan 18 equals the counterpoise 28, the beam 10 moves in a counterclockwise direction about the knife edge 11 and the left end of the beam is disengaged from the switch 34, whereupon the switch 34 opens and renders the vibratory feeder 35 inoperative.

A permanent magnet 36 is attached to the pointer 25 and a magnetically operable switch, indicated generally at 37, is secured to the post 12 adjacent to the magnet when the beam is balanced. An electro-magnetically operated vibrator 40 is attached to the underside of the weigh pan 18 to discharge the weighed material from the pan. It may be assumed that the switch 37 is open when the beam is overbalanced, and closed by the magnet when the beam is balanced by the weight of material in the pan. When the switch 37 is closed, it may be used to connect the vibrating device 40 to a source of potential (not shown) and thereby cause it to discharge the material from the pan. An electrically controlled timing device usually is employed to deenergize the vibrator 40 after it has operated a period of time sufficient to discharge the material from the pan 18. Whether the material is discharged from the pan 18 by this means or by other means, it is a well known characteristic of material weighing apparatus that a small amount of material will stick to the pan 18 and not be removed by the vibrator 40. The controller 20 is provided on the weighing aparatus for preventing the operation of the vibratory feeder 35 if more than a predetermined minimum amount of material sticks in the weigh pan 18 after the discharge cycle of the aparatus is completed.

The controller 20 includes an L-shaped frame 41 (Fig. 1) suspended in an inverted manner on the knife edge 21 by a link 42 and a pin 43 attached to a bracket 44 mounted adjustably on the horizontal leg of the frame 41. The lower end of the vertical leg of the frame 41 is bifurcated at 45 (Figs. 2 and 4) to receive the end of a horizontal leg 75 of a generally inverted T-shaped lever 46 having a bushing 48 which fits over a knife edge 47 provided on a pin 50 secured in the opposed portions of the bifurcated end 45 of the frame 41. The lever 46 is mounted on the bifurcated end of the frame 41 so that a long vertical leg 76 of the lever extends upwardly substantially parallel to the vertical leg of the frame 41. A tare spring 51 has one end connected to the end of another horizontal leg 49 of the lever 46 and the other end thereof is connected to a rod 52 mounted threadedly in the horizontal leg of the frame 41 and locked in a desired position by lock nuts 53—53.

The pan 18 is suspended from the lever 46 by a link 55 having a bifurcated end 56 designed to fit over the edge of the lever 46 so that a bushing 54 provided in the lever 46 engages a knife edge 57 formed on a pin 58 positioned transversely across the bifurcated end of the link 55 (Fig. 2). The arrangement of the knife edge 57 in the bifurcated end 56 is identical with the arrangement of the knife edge 47 in the bifurcated end 45 except that the knife edge 57 is inverted so that the pan 18 is supported on the knife edge. The weight of the weigh pan 18 and of the vibrating apparatus 40 tends to pivot the lever 46 about the knife edge 47 in a clockwise direction, when viewed in Fig. 1. The rod 52 is raised or lowered in the frame 41 to tension the tare spring 51 sufficiently to hold the lever 46 in a substantially horizontal position against the combined weight of the weigh pan 18 and the vibrating apparatus 40. A permanent magnet 59 is mounted on the vertical leg 76 of the lever 46 adjacent to a magnetically operable tare switch indicated generally at 60, secured to the vertical leg of the frame 41.

The magnetic switches 37 and 60 are identical in construction and operation, and only the switch 60 provided on the controller 20 will be described in detail. The switch 60, shown in detail in Fig. 3, comprises a stationary contact 61 and a movable contact 62 secured to a bar 63 attached to one end of a torsion spring 64, the other end of which is secured to a support 66. The stationary contact 61 and the support 66 are anchored in the upper end of a glass envelope 65, and are connected to leads 67 and 68, respectively, by means of which the contacts 61 and 62 may be used to control the continuity of an electric circuit. The stationary contact 61 has the lowermost end thereof resting in a pool of mercury 70 while the movable contact 62 normally is disengaged from the pool of mercury 70 by the spring 64 (Fig. 3).

The switch 60, which is shown in Fig. 3 rotated 180° from the position it assumes in Fig. 1, is mounted on the frame 41 (Fig. 1) so that the bar 63 of the movable contact 62 is positioned adjacent to the magnet 59 secured to the vertical leg 76 of the lever 46. The rod 52 is adjusted on the frame 41 so that the spring 51 just overcomes the weight of the empty pan 18 and the vibrator 40 and holds the vertical leg 76 in a position in which the magnet 59 attracts the bar 63 and pulls the contact 62 against the action of the torsion spring 64 so that the end of the contact engages the mercury 70. When both the contacts 61 and 62 engage the mercury, the mercury provides an electrically conductive path between the contacts. As a result of such an adjustment of the spring 51 by the adjustment of rod 52, if more than a predetermined minimum amount of material clings to the weigh pan 18, it causes the lever 46 to pivot about the knife edge 47 in a clockwise direction against the action of the tare spring 51, and to move the magnet 59 away from the switch 60. This movement of the magnet 59 allows the spring 64 to move the contact 62 out of engagement with the pool of mercury 70, whereupon the switch 60 opens.

The controller 20 is sensitive to small amounts of material that may stick to the weigh pan 18 because of its particular construction. The combined weight of the frame 41 and switch 60 is designed to be substantially equal to the weight of the lever 46. The bracket 44 is mounted adjustably on the frame 41 so that the controller 20 may be adjusted to hang in a vertical position on the knife edge 21. A screw 73 held by a lock nut 74 is provided on the frame 41 to act as an adjustable stop to keep the magnet 59 from striking the glass envelope 65 when the pan is empty.

The pin 58 is positioned sustantially midway between the pin 50 and the lower end of the tare spring 51. With this location of the pin 58, the tare spring 51 may be designed to carry approximately one-half the weight of the empty pan and the vibrator. By virtue of this arrangement, the amount of material required to actuate the lever 46 and open the switch 60 is very small when compared with the total amount of material to be weighed by the apparatus. A small amount of material will pivot the lever in a clockwise direction (Fig. 1) because of the mechanical advantage provided in the lever 46. In this arrangement, the frame 41, the lever 46 and tare spring 51 coact to produce a very sensitive weight actuated controller.

*Operation*

The above-described material weighing apparatus operates in the following manner:

Assuming that the weighing apparatus, shown in Fig. 1, is balanced, a counterpoise 28 corresponding to the amount of material to be weighed in the weigh pan 18 is placed on the counterpoise tray 15. This causes the balance beam to pivot about the knife edge 11 in a clockwise direction until the lug 29 engages the screw 30. When the beam 10 is overbalanced by the counterpoise 28, the pointer 25 attached to the arm 19 moves to the left side of the scale 26 and moves the magnet 36 away from the magnetically operable switch 37. Since the switch 37 is identical in construction with the switch 60, this movement of the magnet 36 disengages the movable contact of the switch from the pool of mercury, and as a result, the switch 37 is open-circuited. The switch 37 is connected to control the continuity of a circuit supplying potential to the vibrating apparatus 40 attached to the weigh pan 18, and since the switch 37 is open, the vibrating apparatus 40 cannot be operated while the pointer 25 is in this position.

This movement of the beam 10 causes the left hand end of the beam to close the switch 34. Since no more than the permissible minimum of material is in the pan 18, the tare spring 51 of the controller 20 holds the lever 46 in such a position that the magnet 59 pulls the contact 62 of the switch 60 into the pool of mercury 70.

Let it be further assumed that the switch 34 and the switch 60 are electrically connected so that both of these switches must be closed before the vibratory feeder 35 can be operated to feed material into the pan 18. Therefore, when the beam 10 closes the switch 34 and the pan 18 is empty except for a minute amount of material, the vibratory feeder 35 is energized and feeds material into the pan 18. As soon as a predetermined minimum amount of material rests on the pan 18, its weight is sufficient to pivot the arm 46 and pull the magnet 59 away from the switch 60 against the action of the tare spring 51, whereupon the contact 62 is disengaged from the pool of mercury by the torsion spring 64 of the switch 60. Electrical interlock contacts generally are included in the circuit so that the switch 34 maintains the vibratory feeder 35 in operation after the switch 60 opens.

When the weight of the material fed into the pan 18 equals the weight of the counterpoise 28, the beam 10 pivots about the knife edge 11 in a counterclockwise direction and assumes a balanced position, as shown in Fig. 1. The movement of the beam 10 in this direction disengages the left hand end of the beam from the switch 34, and allows the switch to open and deenergize the vibratory feeder 35, whereupon the feeding of the material into the pan 18 is stopped. When the beam 10 is balanced by the weight of the material in the pan 18, the pointer 25 assumes its central position on the scale 26 and closes the switch 37, which in turn closes an electric circuit (not shown) to supply potential to the vibrator 40. As a result, the vibrator 40 discharges the material from the pan 18, and as soon as the material starts to discharge from the pan 18, the beam 10 assumes an overbalanced position due to the weight 28, and the switch 37 opens. However, suitable electrical timing apparatus may be arranged in the circuit to maintain the vibrator 40 in operation for a predetermined period of time after the switch 37 is opened.

When the beam 10 is overbalanced by the counterpoise 28, it closes the switch 34 but the vibratory feeder 35 cannot be energized to feed material into the pan 18 during the period of time that the vibrating apparatus is discharging material from the pan 18. When the vibrating apparatus 40 has discharged all the material from the weigh pan 18, except for a predetermined minimum amount which is expected to stick to the pan 18, the tare spring 51 will pivot the lever 46 in a counterclockwise direction to a position in which the magnet 59 exerts sufficient pull on the bar 63 to move the contact 62 into the mercury 70 and thereby form an electrically conductive path between the stationary contact 61 and the movable contact 62. When both the switch 34 and the switch 60 are closed, the vibratory feeder 35 may be energized to again feed material into the weigh pan 18. If more than a predetermined minimum amount of material clings to the pan 18 after the vibrator 40 is deenergized, its weight holds the switch 60 open and thereby prevents subsequent operation of the feeder 35 until the condition is corrected.

In instances where a balance scale of the type described is used to weigh very small quantities of material, the controller 20 must be sensitive enough to detect very small amounts of the material that may stick in the pan 18 after the discharge cycle of the weighing operation has been completed. The total weight of the pan 18 and the vibrator 40 is determined by the maximum amount of material that is to be weighed by the weighing apparatus. The total weight of the pan 18 and the vibrator 40 is the principal factor in determining the sensitivity that may be provided in the controller 20. When a particular weigh pan and its associated vibrator have been determined, the spring 51 is designed to exert a pulling force at a predetermined minimum elongation sufficient to hold the lever 46 against the weight of the empty pan and the vibrator 40 so that the magnet 59 pulls the contact 62 into the mercury 70, and to yield under the weight of a predetermined minimum amount of material that may cling to the pan sufficiently to open the switch 60.

To illustrate the sensitivity that may be obtained in the controller 20, let it be assumed that 40 gram batches of material are to be weighed successively by the apparatus. When a weigh pan and vibrator capable of handling this amount of material are used, it has been found that a tare spring 51 may be selected such that, when an amount of material weighing approximately one-half gram is positioned on the pan, it will overcome the tare spring 51 and move the lever 46 about the knife edge 47 in a clockwise direction and thereby move the magnet 59 away from the switch 60. Therefore, if the vibrator 40 discharges all of the material from the pan 18 except one-half gram, the switch 60 remains open, and the vibratory feeder 35 cannot be operated to feed more material into the weigh pan 18 until some of the remaining one-half gram of material is removed from the pan. As the combined weight of the pan and vibrator of the weighing apparatus is increased, the weight of the minimum amount of material required to operate the controller 20 increases a corresponding amount.

It is to be understood that while the tare controller 20 has been described in connection with apparatus for weighing powdery materials, it also may be used with weighing apparatus designed to weigh predetermined amounts of liquids. While the tare controller 20 has been described as being particularly useful with balance beam scales, it may be readily modified for use with various types of weighing apparatus without departing from the spirit and scope of the invention.

What is claimed is:

1. Material weighing apparatus, which comprises a balance beam, a counterpoise suspended from one end of the beam, an electric switch suspended from the opposite end of the beam, a frame suspended from the said opposite end of the beam, means mounted pivotally on the frame and having a switch actuating means provided thereon, load receiving means suspended from the pivotally mounted means so that the weight thereof tends to cause the pivotally mounted means to move in a direction to open the switch, and yieldable means acting against the weight of the load receiving means for holding the pivotally mounted means in position in which the switch actuating means closes the switch, the force of said yieldable means being such that a predetermined minimum increase in weight on the load receiving means overcomes the yieldable means and causes the actuating means to open the switch.

2. Material weighing apparatus, which comprises a balance beam, a counterpoise tray suspended from one end of the beam, an L-shaped frame suspended in an inverted position from the opposite end of the beam, an electric switch attached to the frame, a lever mounted pivotally on one end of the frame and having means provided thereon for actuating the switch, a load receiving pan suspended from the lever so that the weight of the pan tends to move the lever in a direction to open the switch, and adjustable yieldable means for holding the lever in a position in which it closes the electric switch against the weight of the empty pan, said yieldable means being so adjusted that a predetermined minimum amount of material on the pan causes the lever to open the switch against the action of the yieldable means.

3. Material weighing apparatus, which comprises a balance beam, a counterpoise tray suspended from one end of the balance beam, a frame suspended from the opposite end of the beam and having a vertically extending portion, an electric switch mounted on the vertical portion of the frame, means mounted pivotally on the vertical portion of the frame and having a vertically extending portion, a switch actuating means mounted upon the pivotally mounted means, a load receiving pan suspended from the pivotally mounted means in such a manner that the weight of the pan tends to move the switch actuating means so as to open the switch, resilient means connected to the pivotally mounted means and to the frame so as to hold the actuating means in a position in which it closes the switch against the weight of the empty pan, and means for adjusting the resilient means so that a predetermined minimum amount of material deposited on the pan causes the actuating means to open the switch against the action of the resilient means.

4. Material weighing apparatus, which comprises a balance beam, a counterpoise tray suspended from one end of the beam, an L-shaped frame suspended in an inverted position from the opposite end of the beam, an electric switch attached to the frame, a lever mounted pivotally on one end of the frame and having means provided thereon for actuating the switch, said lever and L-shaped frame being so designed that when they are assembled together they balance each other so that the assembled unit is suspended vertically from the balance beam, a load receiving pan suspended from the lever so that the weight thereof tends to move the lever in a direction to open the switch, yieldable means acting against the weight of the empty pan for holding the lever in a position in which it closes the electric switch, and means for adjusting the yieldable means so that a predetermined minimum amount of material deposited on the pan overcomes the yieldable means and causes the lever to open the switch.

5. Material weighing apparatus, which comprises a balance beam, a counterpoise tray suspended from one end of the beam for receiving a predetermined weight to overbalance the balance beam, an L-shaped frame suspended in an inverted position from the opposite end of the beam so that one leg thereof hangs vertically, an electric switch attached to the vertical leg of the frame, a lever mounted pivotally on the end of the vertical leg of the frame and having means provided thereon for actuating the switch, a load receiving pan suspended from the lever so that the weight of the pan tends to move the lever in a direction to open the switch, said L-shaped frame and lever being so designed that they balance each other and thereby cause the assembly of the frame and and the lever to hang in a vertical position when the pan is empty, resilient means attached to the lever and to the frame in such a manner that it holds the lever in a position in which it closes the electric switch against the weight of the empty pan, and means provided on the frame for adjusting the resilient means so that a predetermined minimum amount of material deposited on the pan causes the lever to open the switch against the action of the resilient means.

6. Material weighing apparatus, which comprises a balance beam, a counterpoise suspended from one end of the beam, an L-shaped frame suspended in an inverted position from the opposite end of the beam, an electric switch attached to the frame, a lever mounted pivotally on one end of the frame and having means provided thereon for actuating the switch, a load receiving pan suspended from the lever so that the weight of the pan tends to move the lever in a direction to open the switch, said L-shaped frame and lever being designed so that they balance each other when they are assembled and cause the frame and the lever to hang vertically from the beam when the pan is empty, resilient means connected to one end of the frame and to one end of the lever for holding the lever in a position in which it closes the electric switch against the weight of the empty pan, said resilient means being so attached to the lever and the frame that the resilient means carries only a portion of the initial weight of the pan, and means for adjusting the resilient means so that a predetermined minimum amount of material deposited on the pan causes the lever to open the switch against the action of the resilient means.

7. Material weighing apparatus, which comprises a balance beam, a counterpoise suspended from one end of the beam, an L-shaped frame suspended in an inverted position from the other end of the beam, an electric switch mounted on the frame, a lever mounted pivotally on the frame for actuating the electric switch, a load receiving pan suspended from the lever, the suspension points of the L-shaped frame and the pan being aligned with each other, so that the frame and the levers hang vertically from the beam, and resilient means connected to the L-shaped frame and the lever for holding the lever in a position in which it closes the electric switch against the weight of the pan, said resilient means being so adjusted that a predetermined small amount of material added to the pan causes the actuating means to open the switch against the opposing action of the resilient means.

8. Material weighing apparatus, which comprises a balance beam, a counterpoise suspended from one end of the beam, an L-shaped frame suspended in an inverted position from the opposite end of the beam, an electric switch mounted on the frame and having a stationary contact and a movable contact, a lever mounted pivotally on one end of the frame and having a permanent magnet attached thereto for actuating the movable contact of the switch, a load receiving pan suspended from the lever in such a manner that the weight of the pan tends to move the lever and disengage the magnet from the switch to open the switch, and resilient means connected to the frame and the lever for holding the lever in a position in which the magnet attached thereto actuates the movable contact and closes the switch, said resilient means being adjustable so that a predetermined minimum amount of material deposited on the pan causes the lever to move the magnet away from the electric switch and thereby open the switch.

9. Material weighing apparatus, which comprises a balance beam, a counterpoise tray suspended from one end of the beam for supporting a weight corresponding to the amount of material to be weighed by the apparatus, an L-shaped frame suspended in an inverted position from the other end of the beam so that one leg hangs vertically, an electric switch attached to the vertical leg of the frame and having a stationary contact resting in a pool of mercury and a movable contact normally disengaged from the mercury, a lever mounted pivotally on the frame and having a permanent magnet attached thereto for actuating the movable contact of the switch, a load receiving pan suspended from the lever in such a manner that the weight of the pan tends to pivot the lever in a direction to move the magnet away from the movable contact of the switch, and resilient means secured to the L-shaped frame and to the lever in such a position that it holds the magnet adjacent to the switch against the weight of the empty pan whereby the magnet actuates the movable contact into the mercury, said resilient means being so adjusted that a predetermined minimum amount of material deposited on the pan causes the lever to move the magnet away from the switch and allow the movable contact to be disengaged from the mercury.

GEORGE P. ADAMS.

References Cited in the file of this patent

UNITED STATES PATENTS

| Number | Name | Date |
|---|---|---|
| 2,066,763 | Bryce | Jan. 5, 1937 |
| 2,336,347 | Clifford | Dec. 7, 1943 |
| 2,348,372 | Weckerly | May 9, 1944 |

OTHER REFERENCES

Page 160 of Industrial Weighing, by Douglas M. Considine, published 1948 by Reinhold Publishing Corp. of 330 West 42nd Street, N. Y.